United States Patent [19]

Makinwa et al.

[11] Patent Number: 5,461,204
[45] Date of Patent: Oct. 24, 1995

[54] SEGMENTED-CORE INDUCTANCE IN STYLUS FOR EM-GRAPHICAL TABLET

[75] Inventors: Kofi A. A. Makinwa; Jan E. Van Beek; Marcellinus A. M. Grooten, all of Eindhoven, Netherlands

[73] Assignee: U.S. Philips Corporation, New York, N.Y.

[21] Appl. No.: 278,209

[22] Filed: Jul. 21, 1994

[30] Foreign Application Priority Data

Apr. 6, 1994 [EP] European Pat. Off. ............. 94200928

[51] Int. Cl.⁶ .................................................. G08C 21/00
[52] U.S. Cl. ............................................. 178/19; 345/179
[58] Field of Search ....................... 178/19, 18; 345/179; 382/3, 13

[56] References Cited

U.S. PATENT DOCUMENTS

| | | | |
|---|---|---|---|
| 4,006,628 | 2/1977 | St. Jacques | 73/141 A |
| 4,713,977 | 12/1987 | Koster et al. | 74/191 |
| 5,206,785 | 4/1993 | Hukashima | 361/283 |
| 5,231,381 | 7/1993 | Duwaer | 340/712 |

FOREIGN PATENT DOCUMENTS

| | | |
|---|---|---|
| 0307667 | 8/1988 | European Pat. Off. . |
| 0421025 | 4/1991 | European Pat. Off. . |

*Primary Examiner*—Stephen Chin
*Assistant Examiner*—Kevin Kim
*Attorney, Agent, or Firm*—David Schreiber

[57] ABSTRACT

A graphical tablet and a stylus interact electromagnetically with one another. The stylus includes a coil and a transducer to affect an inductance of the coil in response to a force exerted on a tip of the stylus. The transducer comprises first and second ferrite cores. The cores are mounted to move with respect to one another in response to the force. The cores are substantially in contact with one another in the absence of the force. Disengaging causes a well detectable jump in the inductance.

9 Claims, 2 Drawing Sheets

SEGMENTED-CORE INDUCTANCE IN STYLUS FOR EM-GRAPHICAL TABLET

FIELD OF THE INVENTION

The invention relates to a data entry system comprising a graphical tablet and a stylus provided with interaction means for electromagnetic interaction with the tablet in response to a force exerted on a tip of the stylus. The interaction means comprises an electrically conductive coil and transducer means to affect an inductance of the coil. The invention also relates to a stylus for use with the tablet.

BACKGROUND ART

The user-friendliness of user-interfaces is one of the key items that govern the acceptance and spread of data processing systems throughout the consumer and professional market segments. In this respect, the graphical user-interfaces such as touch tablets and graphical tablets have become increasingly more important, since "a picture says more than a thousand words". For background information, see European patent application EP-A 0 421 025 (U.S. Pat. No. 5,231,381; PHN 13,100) that discloses data entry systems comprising a plurality of graphical user-interfaces that are functionally and physically integrated with one another and with an LCD.

European patent application EP-A 0 307 667 discloses a coordinate input system wherein the tablet includes a plurality of electrically conductive loops for electromagnetic coupling to an LC tuning circuit in the stylus. Each loop in the tablet is alternately generating an electromagnetic wave of a fixed frequency and thereupon serving as an antenna for detection of the response of the stylus. The wave transmitted by the loop excites a tuning circuit in the stylus, thereby inducing a voltage of a particular frequency. The particular frequency is determined by a force exerted on the tip of the stylus when contacting the tablet. The tuning circuit in turn generates a second wave that is picked up by the loop. The particular frequency of the second wave is a measure of the exerted force. Upon detection by the tablet, the particular frequency can be used to control the size of a cursor shown on the tablet or the thickness of the strokes shown as a result of the data entry.

The tuning circuit includes a coil, which is connected to a capacitor to form an LC circuit. A ferrite core that is moveable into the coil is physically integrated with the tip of the stylus. A force applied to the tip of the stylus causes the tip to move axially with regard to the stylus. The position of the core relative to the coil effectively determines the inductance of the coil and, as a result the frequency of the oscillation set up in the LC circuit.

OBJECT OF THE INVENTION

The stylus of above European patent application EP-A 0 307 667 involves some problems, as acknowledged in U.S. Pat. No. 5,206,785. The displacement of the ferrite core relative to the coil that surrounds it inevitably generates undesirable strokes. The undesirable strokes occur because the tip of the stylus must be translated on the order of 1–2 mm to achieve an adequate inductance change. Further, this travel of 1–2 mm is significantly greater than the displacement of a conventional writing implement, such as a ballpoint pen or a felt tipped pen, during normal operation. Hence, a person using the aforesaid stylus does not get the same feel that he has when manipulating a conventional writing implement. Also, the relatively large displacements give rise to erroneous position indicating readings from the tablet. Another disadvantage is the relatively small dynamic range of the inductance change. The relatively small changes in the tuning circuit's resonant frequency limit the detection resolution.

It is an object of the invention to provide a data entry system using a force-sensitive stylus whose tip travels over an ergonomically acceptable distance, whose activation is well detectable by the tablet and whose accuracy in operational use is considerably higher than that of the prior art.

SUMMARY OF THE INVENTION

To this end, the invention provides a data entry system characterized in that the transducer means comprises first and second cores for determining an inductance value of the coil. The first and second cores are mounted to move with respect to one another in response to the force on the tip. The cores are substantially in contact with one another in the absence of the force.

The invention is based on the insight that the inductance value of the coil changes dramatically when the cores lose contact in response to the force exerted on the tip. This losing contact permits unambiguous detection by the tablet. In order to detect this event, the magnitude of the displacement of the cores relative to one another can be extremely small, in the order of 0,01 min. The movement of the tip is made to correspond to the displacement of the cores with respect to one another. As the tip travel is short and activation is well detectable, it is clear that the stylus in the invention ergonomically functions significantly better than the prior art device.

A variety of arrangements of the cores and the coil are feasible. The cores can be mounted to be in contact with one another substantially half-way down the length of the coil. This arrangement of the cores gives rise to a maximum change in inductance when the cores are removed from one another. Further, the quality factor Q of a coil is maximum when the core material completely occupies the coil's interior, that is, when all the coil's wire is directly wound round the core. The Q-factor is determined by the ratio of the coil's inductance and the coil's ohmic resistance. A high Q-factor implies low power dissipation, which is particularly relevant to a battery-operated stylus.

A large dynamic range and high Q-factor could be attained, e.g., by winding the coil round a thin tube that accommodates both cores, at least one of the cores being slidably mounted in the tube. Apart from the tube being an extra component raising manufacturing costs and weight, a close fitting of the tube around the cores could hamper the sliding of the cores when moisture has found its way to the inside of the stylus, e.g., when the user has inadvertently put the stylus in a glass of vodka.

Preferably, the first core is at least partially inserted in the coil and has a fixed position with respect to the coil. The second core is located substantially outside the coil, and is coupled to the stylus tip for undergoing a displacement in an axial direction of the coil in response to the force on the tip. An elastic means is provided to exert a force on the second core against the direction of displacement, the first core constraining the position of the second core in the absence of the force on the tip. The cores preferably are in physical contact with one another when the force is zero, i.e. the jump in inductance should be significant upon moving the second core.

Metal helical springs turn out to be less suitable as an elastic means for application in the invention. The value of the stiffness attainable, i.e., the ratio of the applied force and the spring's change in length, is too low for the intended purpose. Preferably, the elastic element includes a bush with axial compliance such as a concertina sleeve.

U.S. Pat. No. 4,713,977 discloses a mechanical transmission that comprises an example of a concertina sleeve. The sleeve is provided with two pairs of saw-cuts that are rotated with respect to one another by 90°. A material bridge is located between the saw-cuts of each single pair. The concertina sleeve in the transmission serves to take up alignment errors between two shafts and deformation in a variety of directions, as well as to buffer bending forces. However, the present invention adds an extra dimension to the usefulness of such a sleeve by applying it to a low cost, highly accurate mass production apparatus as a means to furnish a reaction force. Such an elastic means can simply be made, e.g., through die casting, and is preferably made of a synthetic material. The mechanical characteristics of the concertina sleeve such as those that determine the stiffness of the spring and its weight, can be adapted to the desired operation, e.g., by choosing an appropriate material or a suitable geometry regarding the saw cuts.

The invention provides the basis for a user-friendly data entry system and for a stylus that is simple to manufacture, amenable to mass production, reliable, rugged and cheap. Further details are discussed below.

BRIEF DESCRIPTION OF THE DRAWING

The invention is explained below by way of example and with reference to the accompanying drawing, wherein.

Throughout the figures, same reference numerals indicate similar or corresponding features.

DETAILED DESCRIPTION OF THE PREFERRED EMBODIMENTS

Figure 1:
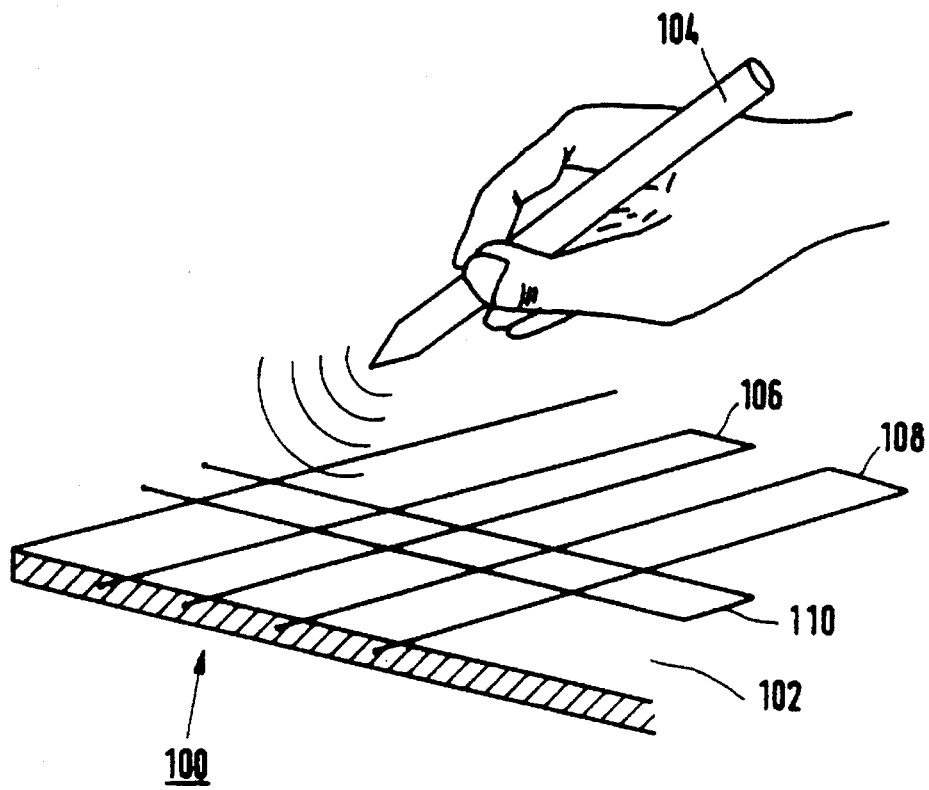
FIG. 1 shows part of a data entry system of the invention.

FIG. 1 gives a diagram of a data entry system 100 in accordance with the invention. System 100 comprises a graphical tablet 102 and a stylus 104. Tablet 102 comprises a plurality of electrically conductive loops, e.g., loops 106, 108 and 110 that serve to locate transmitting stylus 104 relative to tablet 102 in a manner known in the art, e.g., as described in EP-A 0421,025 (U.S. Pat. No. 5,231,381; PHN 13,100).

Figure 2:
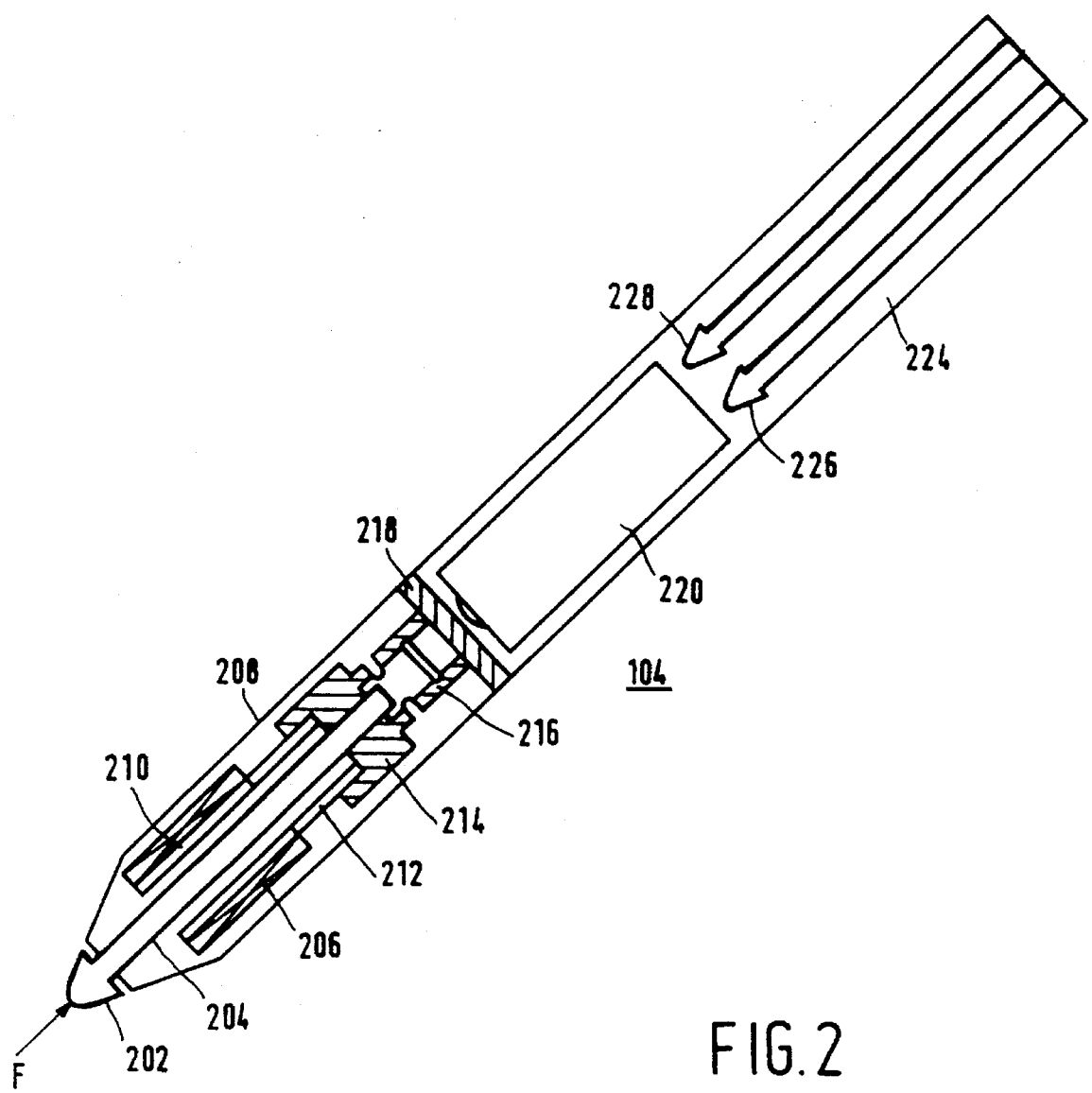
FIG. 2 gives a diagram of a stylus for use in a data system in accordance with the invention.
Figure 3:
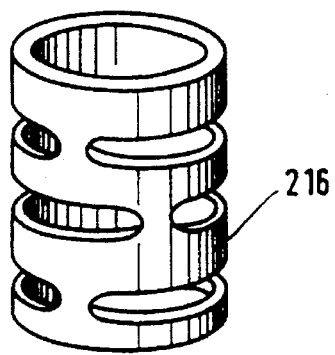
FIG. 3 shows a concertina sleeve for use in the stylus.

FIG. 2 gives a schematic diagram of stylus 104. A tip 202 of stylus is integrated with an elongated member 204. Member 204 is operative to undergo axial displacements when an axial force F is exerted to tip 202. An electrically conductive coil 206 is located co-axially with member 204 and is fixed with regard to a casing 208 of stylus 104. Coil 206 is preferably made of Litze wire that consists of a bundle of tiny strands that are electrically isolated from one another. A first core 210 of material with suitable magnetic permeability, e.g., ferrite, is arranged inside coil 206. First core 210 is located co-axially with coil 206. First core 210 is hollow so that member 204 passes through it. A second core 212 of material of suitable magnetic permeability is arranged co-axially with coil 206 and is located outside coil 206 around member 204. Preferably, second core 212 contacts first core 210 in the absence of force F. Second core 212 is fixed with regard to member 204. In this example, both second core 212 and member 204 are clamped by an elastic holder 214 that fits tightly around core 212 and member 204. Preferably, holder 214 is physically integrated with a spring element 216 that provides a reaction force in response to the displacement of member 204. Spring element 216 comprises a concertina sleeve as discussed above. Spring element 216 rests against a support 218 fixed with regard to casing 208. FIG. 3 shows an example of a concertina sleeve.

Operation is as follows. Stylus 104 transmits an electromagnetic wave for detection by loops 106–110 in tablet 102 in a manner known in the art. The electromagnetic wave is generated in an oscillation circuit (not shown in further detail) of which coil 206 is a functional part. The frequency of the electromagnetic wave is determined by, among other things, the inductance of coil 206. The inductance depends on the material of cores 210 and 212 and on their position relative to coil 206. As known, a core in a coil serves to concentrate the magnetic field lines, and its geometry governs the degree of concentration of the filed lines, and thereby the inductance. In the absence of a force F at tip 202, the frequency of the electromagnetic wave has a predetermined value, dependent on cores 210 and 212 being close together or even being in contact. Within this context, the wording "close together" and "in contact" are to be understood as functionally implying that upon increasing the distance between cores 210 and 212 the jump in the inductance value occurs. As soon as a force F is applied to tip 202, member 204 is displaced inwards, taking second core 212 with it. Disengagement of cores 210 and 212 causes a substantial jump in the inductance of coil 206 and therefore in frequency. Upon detection via loops 106–110 in tablet 102, the frequency jump permits an unambiguous detection of the presence of stylus 104.

Figure 4:
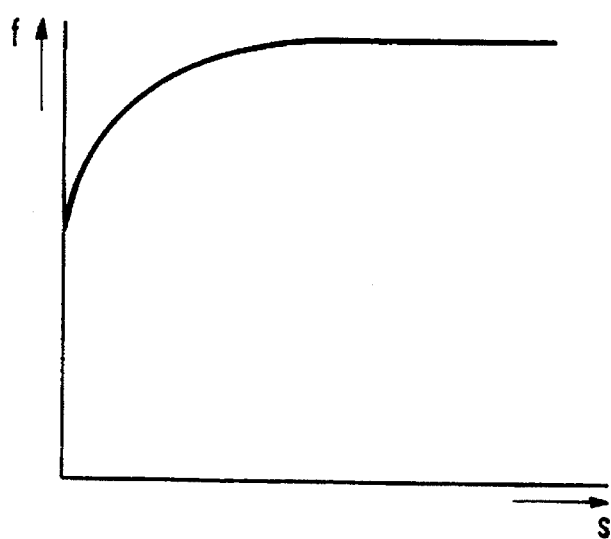
FIG. 4 gives a typical diagram illustrating the dependency of the frequency on the relative distance between the cores.

Further, it is found that the inductance of coil 206 and, therefore, the frequency of the transmitted wave varies strongly with the distance between cores 210 and 212. Accordingly, the frequency is modulated with the force at tip 202 in a well detectable manner. The frequency of the transmitted wave lies between two saturation values, namely one value corresponding to cores 210 and 212 being in contact and another value corresponding to second core 212 being outside a range wherein it has a significant effect on the inductance of coil 206, e.g., core 212 being displaced over more than approximately one min. FIG. 4 gives a diagram illustrating qualitatively a typical curve of the dependency of the frequency f on the relative distance s between cores 210 and 212. Over a range of, say, 0–0.5 mm, the frequency significantly changes by an amount of, say, 50 kHz.

Stylus 104 may be provided with a battery 220, e.g., an AAAA battery or an LR61 battery, for power supply of the oscillation circuit (not shown in further detail) of which coil 206 is a functional part. The power supply can be left on permanently due to the high Q-factor of coil 206. The current supply in a quiescent state is in the order of 50 μA. Alternatively, stylus 104 can be provided with a timer circuit (not shown), e.g., as for pocket calculators, that shut off power supply when the stylus is in a quiescent state after a predetermined period of time. The turning-on can be implemented by using a switch, e.g., a pressure sensitive switch, to be manually operated by the user, or a switch that is functionally integrated with the transducer means.

Stylus 104 can also be provided with a compartment 224, e.g., for accommodating spare tips 226 and 228. Tips 226 and 228 and tip 202 may be of mutually different materials or shapes that determine the friction between tablet 102 and stylus 104 when writing or drafting on tablet 102. The user can replace tip 202 by another one that gives the desired impression of conventional drawing or writing on a sheet of paper. For easy replacement, member 204 fits tightly in holder 214 and is engaged or disengaged by elastic deformation of holder 214.

What is claimed is:

1. A data entry system comprising:

a graphical tablet; and a stylus having a tip for applying a force to the tablet; said stylus including an electrically conductive coil and a transducing circuit having a first core and a second core mounted to move with respect to one another in response to the forces for generating an inductance in the coil responsive to a distance between the first core and the second core, the first core being substantially in contact with the second core in the absence of the force and the distance between the first core and second core increasing as the force increases.

2. The system as claimed in claim 1, wherein the first core is at least partially inserted in the coil, the second core is located substantially outside the coil and coupled to the tip for undergoing a first displacement away from the first core in response to the force.

3. The system as claimed in claim 2, wherein the transducing means includes an elastic member for exerting a reaction force on the second core member in a direction opposite the displacement.

4. The system as claimed in claim 2, wherein the stylus includes an elongated member coupled to the tip, the stylus includes a housing coupled to the coil and first core, the first core includes a first sleeve, the second core includes a second sleeve attached to the elongated member and the first sleeve is located between the tip and the second sleeve.

5. The system as claimed in claim 4, wherein the stylus includes a holding member for holding the tip in response to elastic deformation of the holding member.

6. The system as claimed in claim 3, wherein the elastic member is a concertina sleeve.

7. The system as claimed in claim 6, wherein the elastic member is integrally formed with the holding member.

8. The system as claimed in claim 3, wherein the elastic member is integrally formed with the holding member.

9. A stylus for applying a force to a graphical tablet, said stylus comprising:

an electrically conductive coil; and a transducing circuit having a first core and a second core mounted to move with respect to one another in response to the force for generating an inductance in the coil responsive to a distance between the first core and the second core, the first core being substantially in contact with the second core in the absence of the force and the distance between the first core and the second core increasing as the force increases.

* * * * *